Oct. 7, 1958
J. Q. HORNE, JR
2,855,001
MIXING VALVE
Filed April 26, 1954
3 Sheets-Sheet 1
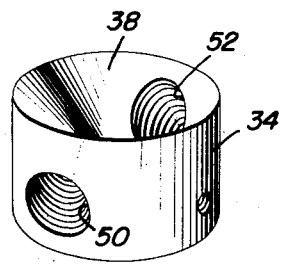
Fig. 9
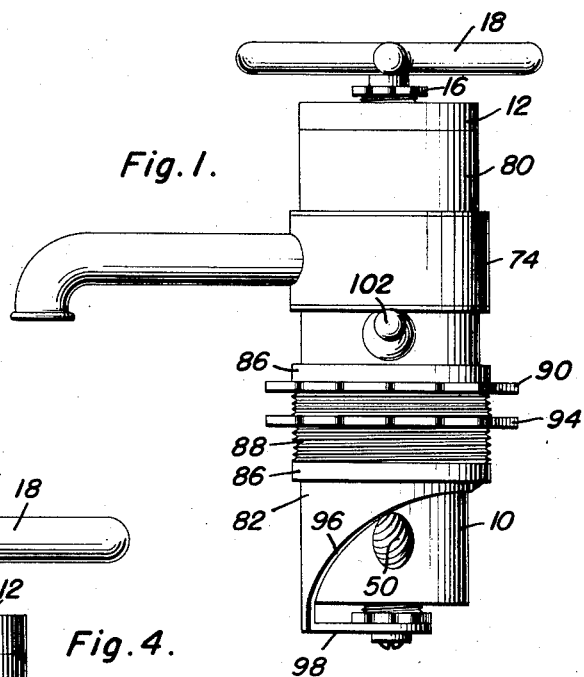
Fig. 1.
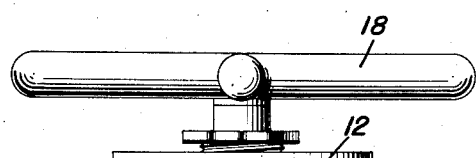
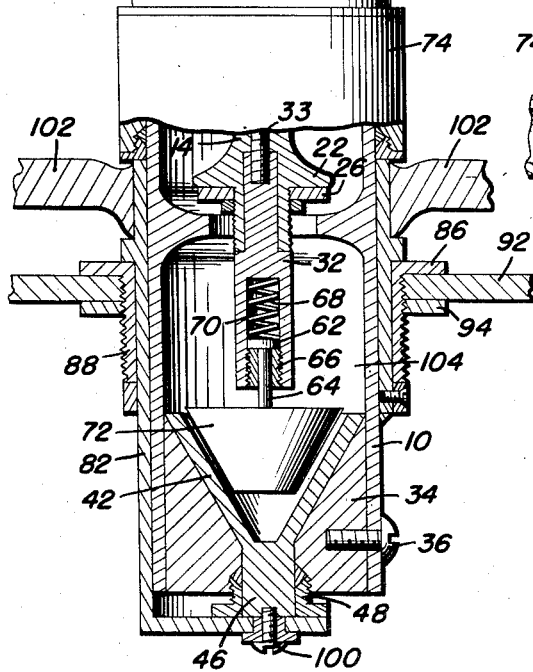
Fig. 4.
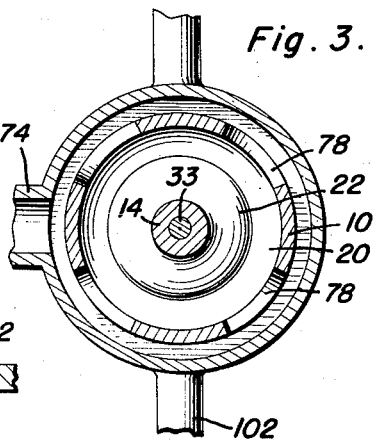
Fig. 3.
Inventor
James Q. Horne, Jr.
By Clarence A. O'Brien
and Harvey B. Jacobson
Attorneys

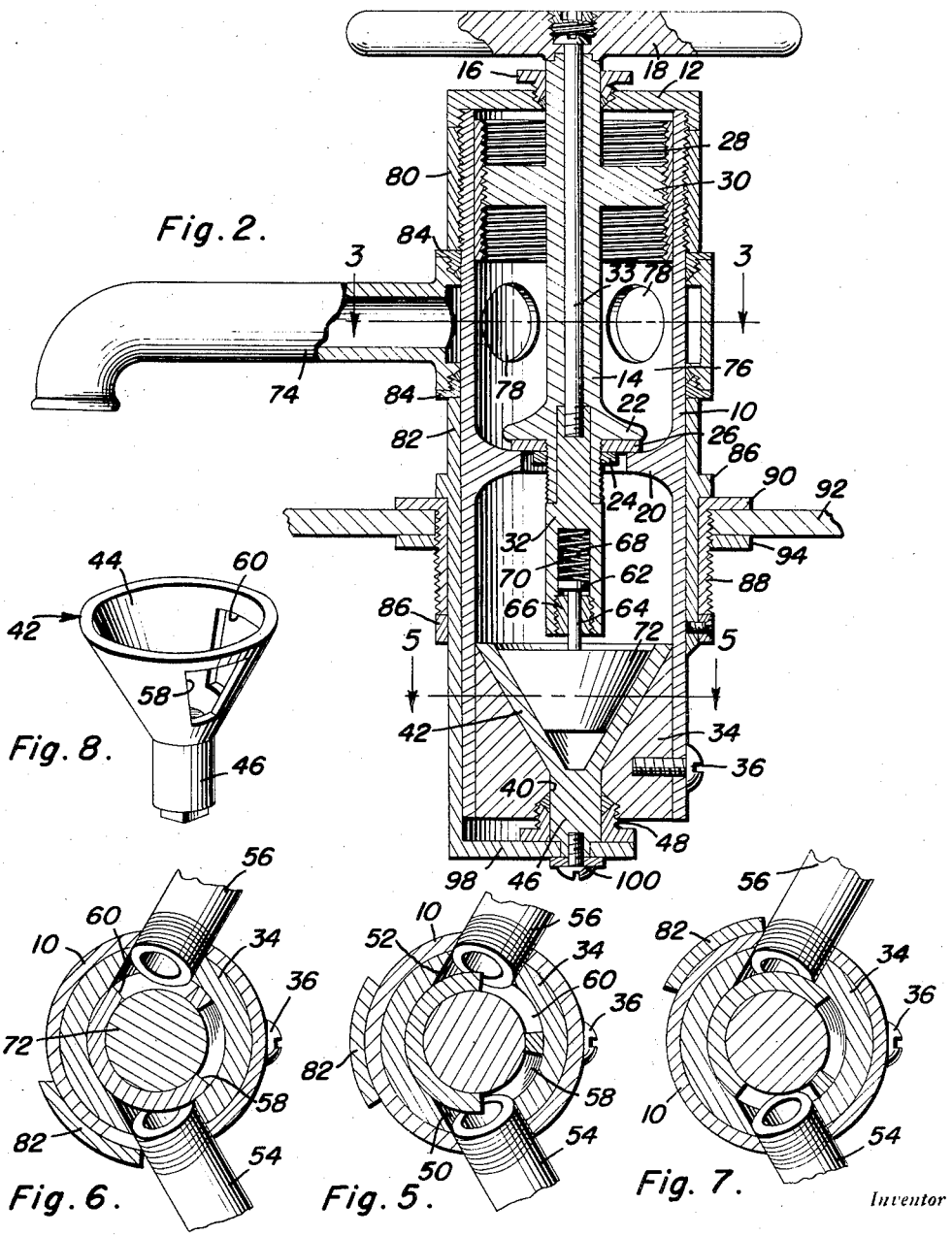

Oct. 7, 1958 J. Q. HORNE, JR 2,855,001
MIXING VALVE
Filed April 26, 1954 3 Sheets-Sheet 3
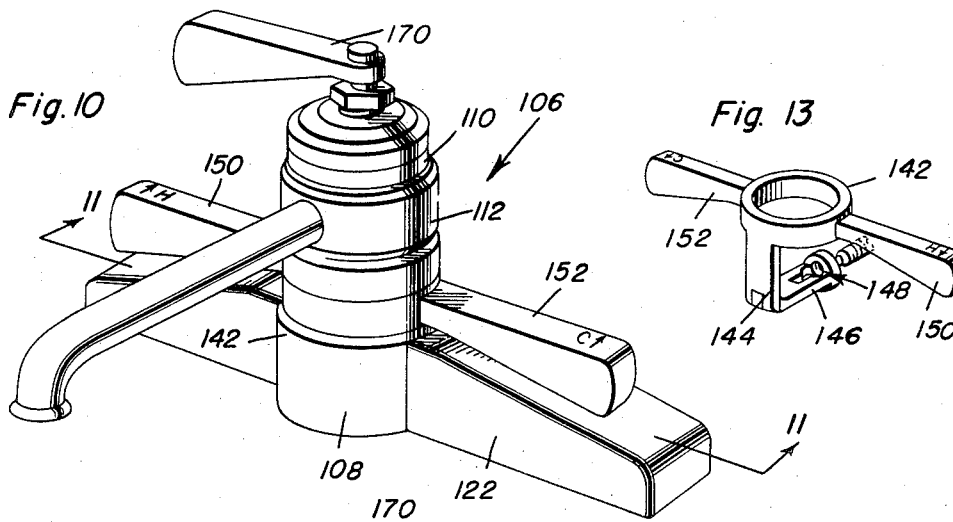
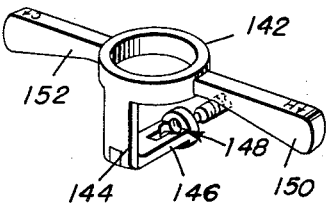
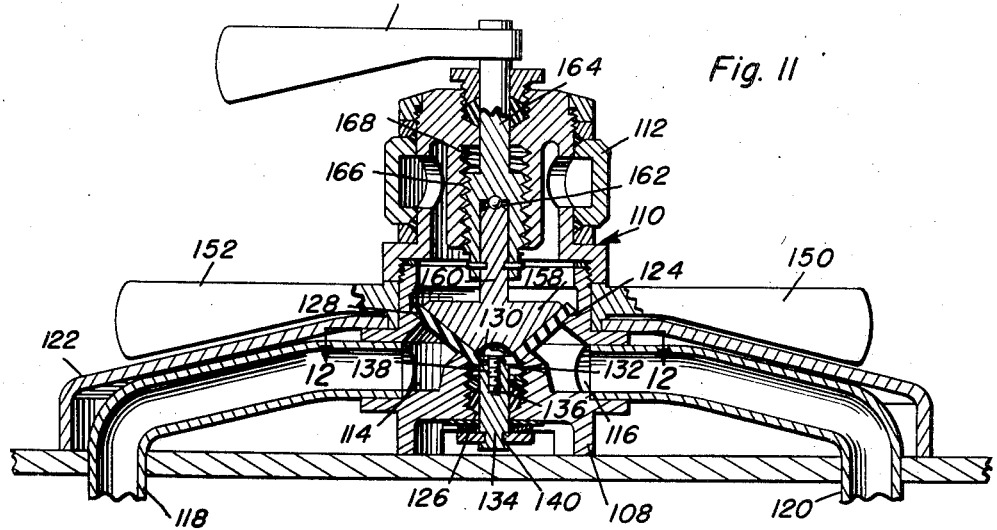
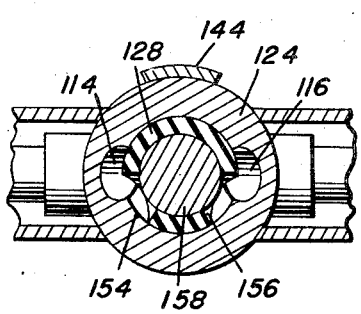
James Q. Horne, Jr.
INVENTOR.

United States Patent Office 2,855,001
Patented Oct. 7, 1958

2,855,001

MIXING VALVE

James Q. Horne, Jr., Princeton, N. J.

Application April 26, 1954, Serial No. 425,605

16 Claims. (Cl. 137—637.4)

This invention relates to mixing valves and more particularly to a mixing valve having a mixing chamber therein with an outlet control valve for said chamber together with means for proportioning the fluids being mixed.

The primary object of the invention is to provide a novel conical valve assembly for controlling the passage of fluids into a valve casing.

An important object of this invention is to enable an operator to mix two separate streams of material thoroughly in predetermined proportions and simultaneously control the total flow of the mixed materials.

Another important object of this invention, in accordance with the foregoing objects, is to enable an operator to vary the proportions of the separate streams of material without substantially changing the total flow of mixed material.

Still another important object of the present invention is to prevent premature mixing of the separate streams of material.

A further important object of this invention is to enable an operator in conformity with the foregoing objects to mix separate streams of material under pressure.

A meritorious feature of the present invention resides in the resilient connection between the selector valve plug and the outlet control valve which permits easy adjustment of the selector valve at all times, and which insures full closure of the outlet control valve although the same may be worn.

Another important feature of the present invention resides in the slight bearing pressure required between the selector valve plug and the selector valve, whereby the selector valve may be easily adjusted although in engagement with the plug, which arrangement also permits the use of parts that are not critical in tolerance.

A final feature to be specifically enumerated herein resides in the means provided for adjusting the selector valve.

These, together with various ancillary features and objects of the invention which will later become apparent as the following description proceeds, are attained by the present invention, a preferred embodiment of which has been illustrated by way of example only in the accompanying drawings, wherein:

Figure 1 is a side elevational view of the present invention;

Figure 2 is a side elevational view of the present invention, showing the working parts thereof in vertical section and with the mixing valve closed, and with the valve attached to a supporting surface;

Figure 3 is a horizontal sectional detail view taken upon the plane of the section line 3—3 of Figure 2;

Figure 4 is a view similar to that shown in Figure 2, being taken at right angles thereto and showing the valve in the open position;

Figure 5 is a horizontal sectional view taken upon the plane of the section line 5—5 of Figure 2 and showing the selector valve in position to permit flow from each of the conduits;

Figure 6 is a horizontal sectional view similar to that shown in Figure 5, and showing the selector valve shifted to close one conduit and to fully open the other conduit;

Figure 7 is a horizontal sectional view similar to that shown in Figure 6, and showing the selector valve shifted to an alternate position reversing the conduit that is open;

Figure 8 is a perspective view of the selector valve;

Figure 9 is a perspective view of the valve body associated with the selector valve shown in Figure 8;

Figure 10 is a perspective view of a simplified valve construction;

Figure 11 is a cross-sectional view of the valve taken substantially along the plane of section line 11—11 of Figure 10;

Figure 12 is a top cross sectional view of the conical valve assembly taken substantially along the plane of section line 12—12 of Figure 11, and Figure 13 is a perspective view of the conical valve rotating means of the valve construction of Figure 10.

Reference is now made more specifically to the accompanying drawings, wherein like numerals designate similar parts throughout the various views, and in which a valve housing is indicated by the numeral 10.

The upper end of the housing 10 is closed by a cap 12 through which passes a valve stem 14. Suitable packing and a gland 16 are provided to prevent leakage of fluid through the cap 12 around the stem 14, and a handle 18 is secured to the upper end of the stem 14 for turning the same. An inwardly extending annular rib 20 formed on the inner wall of the housing 10 provides a valve seat for a valve 22 formed adjacent the lower end of the valve stem 14. The valve stem 14 extends below the valve 22 and is threaded whereby a collar 24 retains suitable valve packing material or sealing ring 26 against the valve 22. An internally threaded sleeve 28 is snugly fitted within the upper end of the housing 10 and engages a threaded annular portion 30 carried on the valve stem 14 whereby rotation of the valve stem 14 by means of the handle 18 selectively opens and closes the valve seat.

The lower end of the valve stem 14 is counterbored to receive the reduced upper end of a connection member 32 and is secured therein by means of a bolt 33 which extends through a longitudinal bore in the valve stem 14 and threadingly engages the member 32.

A valve body member 34 is secured in the lower end of the housing 10 as by a fastener 36, and as best shown in Figure 9 the valve body 34 has a conically concaved upper surface 38 and an axial bore 40 therethrough. A selector valve 42 is best shown in Figure 8 as having a frusto-conical wall 44 and a lower portion 46. The selector valve 42 is seated in the valve body 34 with the lower portion 46 extending through the bore 40 and with the outer surface of the wall 44 contacting the concave surface 38 of the valve body 34. As will be understood, the selector valve 42 is free to rotate in the valve body 34, sealing means 48 being provided to prevent the leakage of fluid through the bore 40 around the lower portion 46 of the selector valve 42.

As best shown in Figures 5–7 and Figure 9, the valve body 34 is preferably provided with angularly inclined ports 50 and 52 which threadingly receive conduits 54 and 56 respectively that pass through suitable apertures in the housing 10. The wall 44 of the selector valve 42 is provided with a pair of openings 58 and 60 which are disposed to selectively register with the ports 50 and 52.

The lower end of the connecting member 32 is provided with a blind bore 70 which receives the upper enlarged end 62 of a rod 64. The rod 64 is slidable through a nut 66 which retains the enlarged portion 62 within the bore 70. A compression spring 68 is seated within the bore 70 so as to urge the rod 64 downwardly. A plug 72 of frusto-conical shape is secured to the lower end of the rod 64 and is adapted to contact the inner surface of the wall 44 of the selector valve so as to close the openings 58 and 60.

Outlet means are provided for the mixing valve which include a swivel type faucet 74 which communicates with an outlet chamber 76 through openings 78 in the housing 10. It will be understood that the faucet 74 is rotatable about the housing 10 so that the mixed fluid may be directed away from the housing 10 in any desired direction. The faucet 74 is retained on the housing 10 between a collar 80 and a sleeve 82 with packing and glands 84 being provided to prevent leakage around the annular edges of the faucet 74 connections.

The sleeve 82 is rotatable on the valve housing 10 and is provided with annular ribs 86 between which is rotatably received an externally threaded collar 88 having an annular flange 90. The mixing valve is secured to a supporting wall 92 by engaging the wall between the flange 90 and a nut 94 threaded on the collar 88.

The rotatable sleeve 82 is cut away as at 96 along its lower extremity, see Figure 1, so that the sleeve 82 will not cover or close the ports 50 and 52. An inwardly extending arm 98 is carried at the lower end of the sleeve 82 and is fixedly secured to the lower portion 46 of the selector valve 42 as by a fastener 100. A radially extending handle 102 is provided on the sleeve 82 for manually rotating the sleeve 82 on the valve housing 10.

From the foregoing it is believed that the operation of the mixing valve will be readily understood. As best shown in Figures 5–7, it will be understood that the selector valve 42 when rotated relative to the valve body 34 controls the proportion of fluids which may enter the valve housing 10 through the conduits 54 and 56. It will be appreciated upon examination of Figures 5–7 that the selector valve 42 serves to open one conduit while closing the other upon rotation and that the resistance offered by the selector valve to the total flow from the conduits remains substantially constant.

It will be understood that although additional means may be provided to prevent rotation of the valve housing 10 relative to the surface 92 it has been found that the conduits 54 and 56 being secured to the valve body 34 which is in turn connected by the fastener 36 to the housing 10 is sufficient for this purpose, since the plumbing of which the conduits are a part is normally rigid. It will therefore be seen that the position of the selector valve 42 may be adjusted at any time by rotating the sleeve 82, by means of the handle 102 upon the housing 10 which is held against rotation as mentioned.

By virtue of the connection between the valve 22 and the plug 72 it will be understood that opening of the valve 22 by means of the handle 18 will raise the plug 72 from its seat in the selector valve 42 whereby fluid will enter the mixing chamber 104 within the valve housing 10 in predetermined proportions from the conduits 54 and 56. The materials entering the mixing chamber 104 will commingle within the chamber 104 under pressure and will proceed from the chamber 104 under control of the valve 22 to be further mixed in the outlet chamber 76 before moving out the faucet 74. Upon closing the valve 22, the plug 72 drops to the position shown in Figure 2 closing the openings 58 and 60 thereby preventing intermingling of materials contained in the conduits 54 and 56.

The present invention possesses numerous inherent advantages such as wearing of the sealing material 26 on the outlet valves 22 not interfering with the action of the plug 72 to close the openings in the selector valve 42 due to the resiliency of the spring 68. It will be readily seen that any time material is passing the valve 22 the pressure in the mixing chamber 104 will be less than that in the conduits 54 and 56 whereby the difference in pressures unseats the plug 72 against the action of the spring 68 to permit material to enter the mixing chamber 104, and that therefore the plug 72 will be raised any time the valve 22 is open to an extent dependent upon the flow of material through the valve 22 or the pressure within the mixing chamber 104. Since the plug 72 serves primarily to prevent intermingling of the materials in the conduits 54 and 56, the tolerances between the plug 72 and the selector valve 42 are not critical and the cost of production is thereby decreased, and furthermore, the plug 72 is not required to be in tight engagement with the selector valve 42 so that the selector valve 42 may be easily turned or adjusted when the plug 72 is in engagement with the same.

Although the present invention will undoubtedly find use for mixing streams of the same composition having different temperatures for use with such devices as showers or the like, it is expected that the device will find utility in the chemical industry inasmuch as the device will find wide and varied applications in this field, since the mixing chamber is under substantially the pressure existing in the conduits 54 and 56 so that materials of different composition such as a gas and a liquid may be effectively mixed in the chamber 104, the pressure serving to bring the liquid and gas in intimate contact.

In Figures 10–13 is shown a simplified valve construction utilizing the conical valve assembly of the present invention. In Figure 10 is shown a typical faucet arrangement utilizing the valve assembly of the present invention, this faucet assembly being designated in its entirety by the numeral 106.

To form the assembly, the valve body 108 has a hollow casing 110 mounted thereon which carries a swivel type faucet 112.

At diametrically opposite sides thereof, the valve body 108 is provided with a pair of liquid inlet passages 114 and 116 respectively which suitably communicates with hot and cold water conduits 118 and 120 respectively. Cover 122 may conceal these conduits from view when necessary. The valve body 108 is provided with a dished, or concave conical valve seat 124 into the diametrically opposite sides of which the liquid inlet passages 114 and 116 open. The valve body 108 is provided with a longitudinal center bore therethrough which opens into the apex of the conical valve seat.

A hollow conical valve member 128 rotatably seats on the valve seat 124. The hollow, conical valve 128 is provided with an aperture 130 through the apex thereof and a suitable fastening means 132 retains the valve 128 in rotatable, seating relation on the valve seat 124.

The fastening means 132 consists of a short cylindrical rod 134 having an internally threaded blind bore opening into the top thereof and designated by the numeral 136. Cooperating portions of valve 128 and the fastening means 132 non-rotatably attach these portions to one another. Threaded fastener 138 extends through the aperture 130 in the hollow conical valve 128 and is threaded into the bore 136 on the rod 134. At its lower end portion, the rod 134 is grooved on the diametrically opposite sides thereof as at 140.

Collar 142 rotatably carried by the valve body 108 has a leg 144 depending therefrom. From the free end of the leg 144 extends a horizontal arm 146. The arm 146 is provided with a keyhole slot and a setscrew arrangement 148 whereby the grooved lower end portion of the short rod 134 is secured thereto. Consequently, by rotation of the collar 142 by means of the handles 150 and 152 the hollow conical valve 128 is rotated.

Noting particularly Figure 12 it will be seen that the conical valve 128 is provided with openings 154 and 156 respectively therethrough which selectively, respectively, register with the passages 114 and 116 opening into the valve seat 124 in the same manner as shown in Figures 5–7. It is to be further noted that by proper spacing of the ports 154 and 156 through the conical valve 128, the valve is capable of turning to an off position by opposite rotation. In other words, noting Figure 12 upon clockwise rotation the port 154 would be disposed to the right of the opening 114 while the port 156 would be disposed to the right of opening 116 thereby closing both these openings. Conversely, when rotated in counter-clockwise direction, the port 154 could be to the left of the opening 114 while the port 156 would be to the left of the opening 116.

Normally seating against the conical valve 128 is the conical plug 158 which prevents the flow of fluids into the valve casing 110 notwithstanding the particular position of the ports 154 and 156 on the hollow valve 128.

The conical plug 158 is provided with a vertically extending stem 160 which is freely rotatably and non-slidably retained within a smooth bore 162 opening into the lower end of an operating rod or stem 164 projecting upwardly through the upper end of the casing 110. The stem 164 is provided with a threaded portion 166 threaded through the passage 168 through the valve casing whereby upon rotation of the stem 164 the plug 158 will be lifted from and returned to seating engagement with the conical valve 128. To rotate this operating stem 164, handle 170 is provided at the top of the rod.

The operation of this form of the device is relatively simple. By rotating one of the handles 150 or 152, the hollow, conical valve 128 is rotated to bring the ports 154 and 156 thereof into proportionate registry with the passages 114 and 116 opening into the valve seat 124 to mix the hot and cold water in the desired proportion to regulate the temperature thereof. Then, by turning the handle 170 and lifting the plug 158, the fluid is permitted to enter the valve casing chamber and mix therein prior to its passage outwardly through the faucet. To turn the valve off, it is only necessary to rotate handle 170 in the opposite direction to seat the plug 158 on the valve 128 without disturbing the preset temperature characteristic of the mixed fluids. Of course, the valve port 154 may individually register with the passage 114 to the exclusion of registry of the valve port 156 with the passage 116 to permit the fluid from only the passage 114 to enter the casing chamber and pass out through the faucet. Or, conversely, valve port 156 may be brought into registry with the passage 116 to the exclusion of registry of port 154 with passage 114.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A mixing valve comprising a valve housing having mixing and outlet chambers therein, said chambers being adjacent one another and a control valve interposed between said chambers, said housing having a pair of inlet ports communicating with said mixing chamber for introducing separate streams of material thereinto, a selector valve in said mixing chamber having openings therein registrable with said inlet ports controlling the relative flow of material therethrough, and means resiliently connected to said control valve and seating against said openings normally closing said ports, said means opening said ports in response to a reduction of pressure within the mixing chamber upon the flow of material through said outlet chamber, and operating means for said control and selector valves.

2. A mixing valve comprising a valve housing having a mixing chamber therein, outlet means communicating with said chamber, a control valve interposed between said outlet means and said chamber, a pair of inlet ports communicating with said chamber for introducing separate streams of material under pressure thereinto, a selector valve in said mixing chamber having openings therein registrable with said inlet ports controlling the relative flow of material therethrough, and plug means operatively connected to said control valve and seating against said openings normally closing said ports, said plug means being responsive to pressure changes in said chamber for restricting the flow of material through said ports, and operators for said valves.

3. A mixing valve comprising a valve housing having a mixing chamber therein, a body member secured to said housing and closing the lower end of said mixing chamber, said body member having a conically tapered valve seat therein and a pair of inlet passages opening into said seat, a selector valve being rotatably seated in said seat and having openings therein selectively registering with said inlet passages, a plug seating on said selector valve and normally closing said valve openings, said mixing chamber having an outlet opening in the upper end thereof, a control valve closing said outlet opening and a connecting member resiliently connecting said control valve and said plug for limited movement relative to one another and normally urging said plug into seating engagement with said selector valve, and operating means for said control valve and said selector valve.

4. The combination of claim 3 wherein said selector valve comprises a conically tapered sleeve and said plug seats in said sleeve.

5. The combination of claim 4, said connecting member having an axial bore in its lower end, a stem having an enlarged head and extending upwardly from said plug and being disposed in said bore, a stop at the mouth of said bore, and a resilient spring in said bore normally urging the stem head against said stop.

6. A mixing valve comprising a valve housing having a mixing chamber therein, outlet means for said chamber and a control valve interposed between said outlet means and said mixing chamber normally closing one end of said mixing chamber, a valve body closing the other end of said chamber and having a plurality of inlet ports therein, a selector valve seating on said valve body and having openings registrable with said inlet ports for introducing fluid under pressure into said mixnig chamber, a valve operating stem on said control valve extending into said mixing chamber, plug means resiliently connected to said valve stem and seating against said selector valve normally closing said openings, means for operating said selector valve, said plug means unseating from said selector valve in response to a decrease in pressure in said mixing chamber upon opening of said control valve.

7. The combination of claim 6 wherein said outlet means comprises said housing having an outlet chamber therein provided with a plurality of outlet ports therein, a swivelly mounted faucet on said housing selectively communicating with said outlet ports.

8. A mixing valve comprising a valve housing having a mixing chamber therein, outlet means for said chamber and a control valve at one end of said chamber for closing said outlet means, a valve body closing the other end of said chamber and having a pair of inlet ports therein, a selector valve seating on said valve body and having openings registrable with said inlet ports, a plug seating in said selector valve and normally closing said openings, operators for said control valve and said selector valve, extensible means operatively connecting said control valve operator and said plug for limited movement relative to one another in response to pressure variations in said mixing chamber.

9. The combination of claim 8 wherein said extensible means includes a connecting member having one end secured to said control valve operator and having an axial bore in its other end, said plug including a stem slidably disposed in said bore and having an enlarged head, a stop at the mouth of said bore, and a resilient element in said bore urging said stem head toward said stop.

10. The combination of claim 8 wherein said control valve operator includes a valve stem extending into said mixing chamber, said extensible means being connected to said stem.

11. A mixing valve comprising a valve housing having an annular valve seat with a pair of inlet ports therein, a selector valve comprising a sleeve having circumferentially spaced openings each registrable with one of said inlet ports and controlling relative flow through the latter, means securing said sleeve to said valve seat for surface to surface contact and for rotation about an axis common to said valve seat and sleeve, discharge means for said valve housing communicating with said valve seat and said sleeve, a plug received and directly seated in said sleeve and arranged to directly close said openings, means operatively connected to said plug for moving the latter towards and from said sleeve whereby said plug will control total flow from said openings to said discharge means.

12. The combination of claim 11 wherein said sleeve and seat and said plug have complementary conical surfaces and are disposed in nested relation.

13. The combination of claim 11 including means for effecting independent rotation of said sleeve and reciprocation of said plug along said axis to thereby respectively proportion the flow through said opening and control the total flow through said openings.

14. The combination of claim 11 wherein said means for moving said plug includes a resilient connection yieldingly urging said plug toward said sleeve.

15. A mixing valve comprising a valve housing having an annular valve seat with a pair of inlet ports opening thereinto, a selector valve rotatably seated in said seat and comprising a sleeve having a pair of circumferentially spaced openings therein each registrable with and controlling flow from one of said inlet ports and thereby proportioning flow from said pair of inlet ports, said sleeve preventing communication between said inlet ports when it closes either of the latter, means securing said sleeve to said seat for surface to surface contact therewith and for rotation about an axis common to said sleeve and seat, discharge means for said valve housing communicating with said sleeve, valve means extending into and directly seated upon said sleeve and cooperating with the latter and arranged to directly close each of said openings thereby controlling total flow from said openings to said discharge means.

16. The combination of claim 15 including a plug received in said sleeve and controlling said openings, means for effecting independent rotation of said sleeve and reciprocation of said plug along said axis to thereby respectively proportion the flow through said opening and control the total flow through said openings.

References Cited in the file of this patent

UNITED STATES PATENTS

| 965,555 | Beeker | July 26, 1910 |
| 1,145,271 | Scanlan | July 6, 1915 |
| 1,261,326 | Vaughn et al. | Apr. 2, 1918 |
| 1,504,498 | Petcher | Aug. 12, 1924 |
| 1,607,935 | Ackley | Nov. 23, 1926 |
| 1,856,458 | Bentley | May 3, 1932 |
| 2,800,923 | Russell | July 30, 1957 |

FOREIGN PATENTS

| 120,131 | Australia | June 28, 1945 |